J. VAN VRANKEN.
SELF PROPELLED PLOW.
APPLICATION FILED JULY 10, 1911.
1,043,174.
Patented Nov. 5, 1912.
3 SHEETS—SHEET 1.
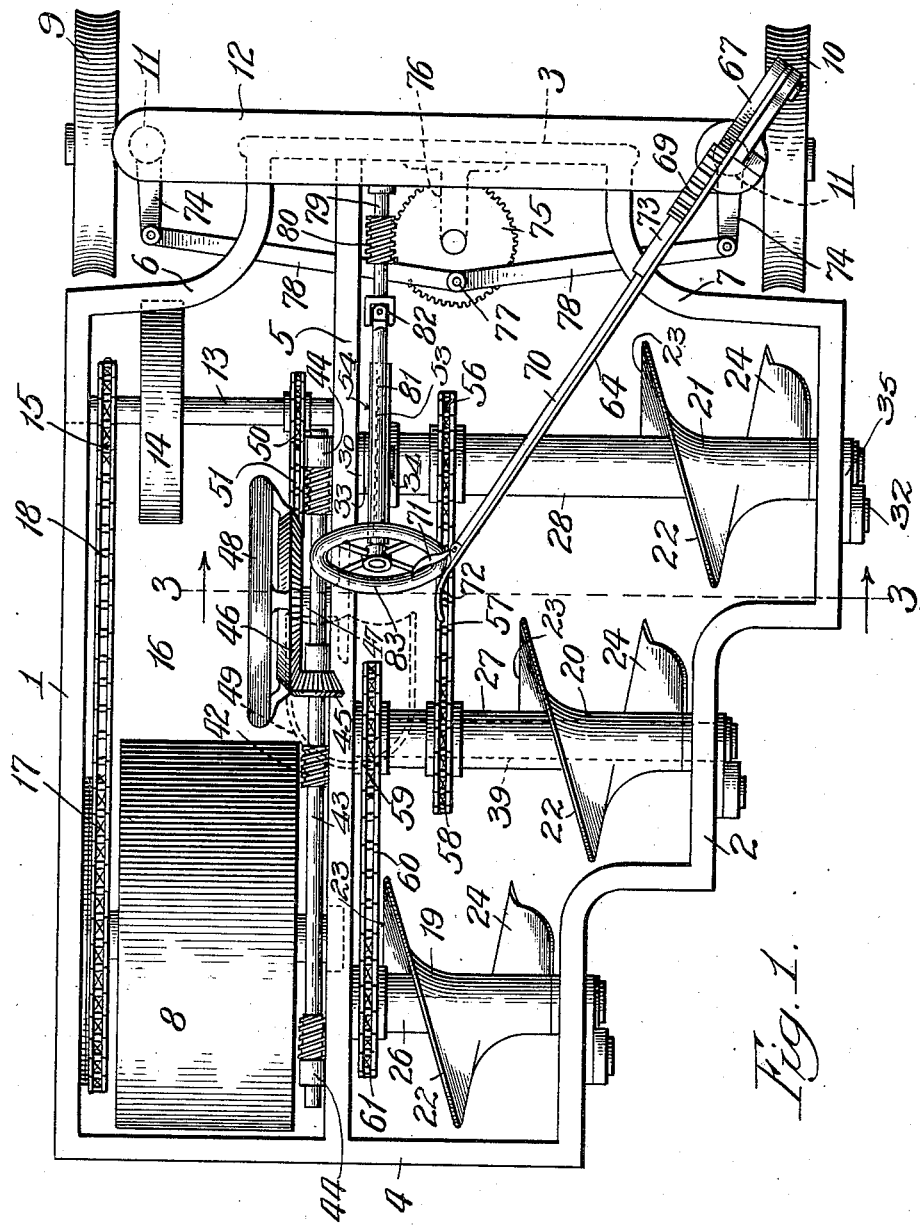
Witnesses:
John Enders
George Mankle
Inventor:
Jay Van Vranken,
by Wallace R. Lane
Atty.

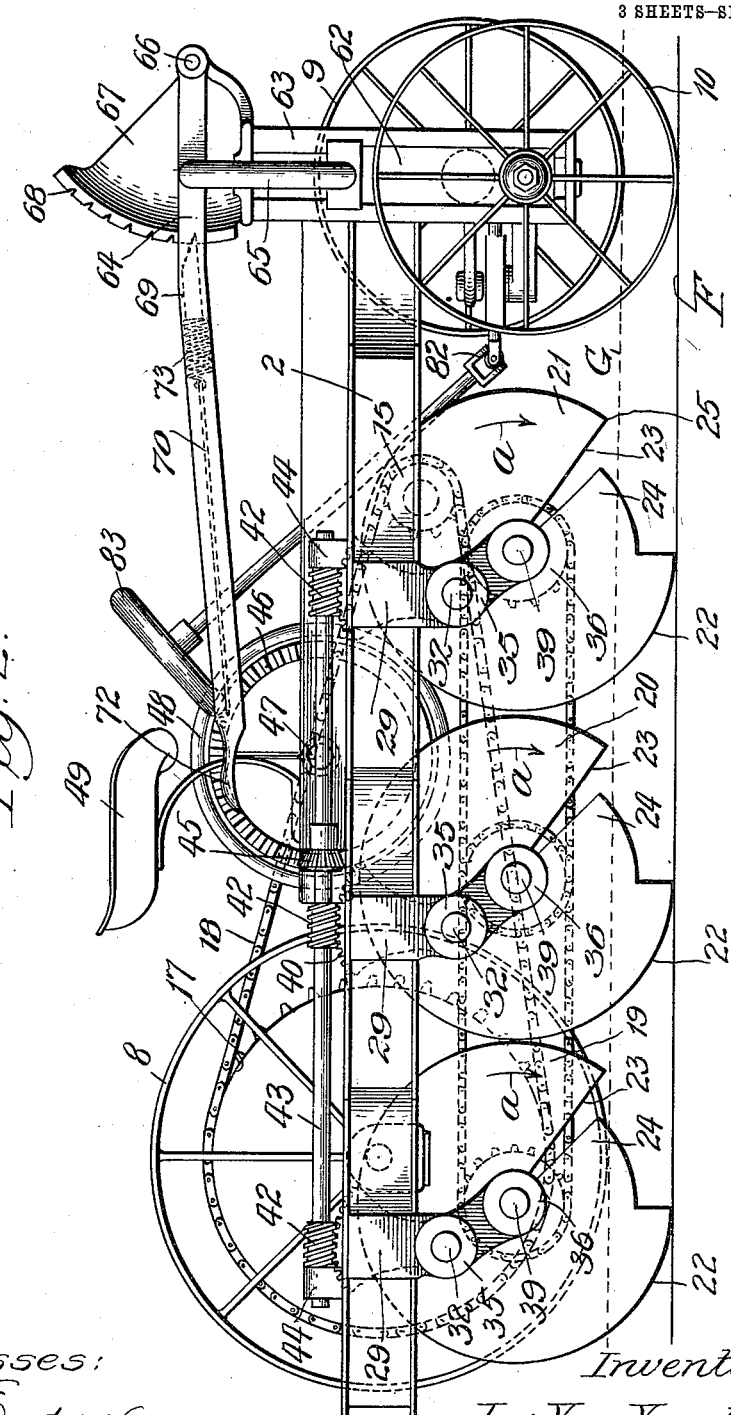

J. VAN VRANKEN.
SELF PROPELLED PLOW.
APPLICATION FILED JULY 10, 1911.
1,043,174.
Patented Nov. 5, 1912.
3 SHEETS—SHEET 3.
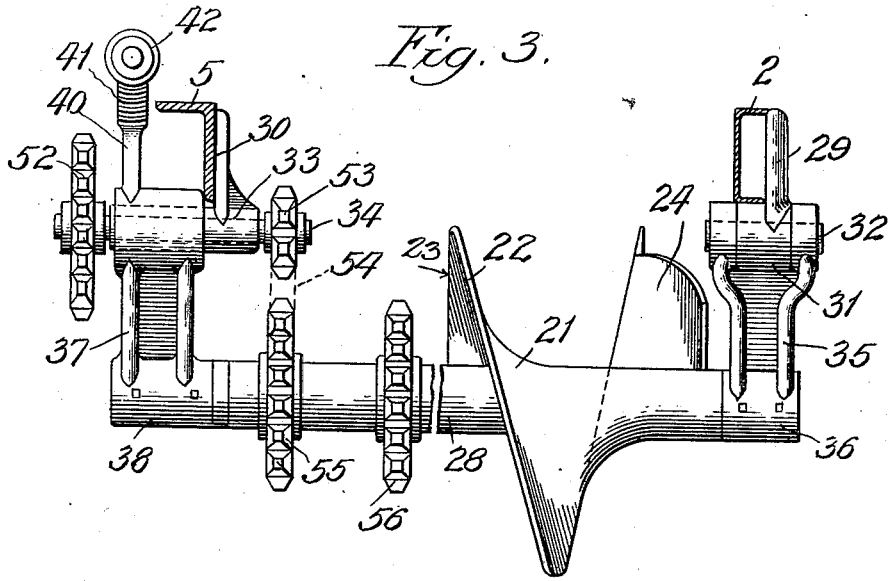
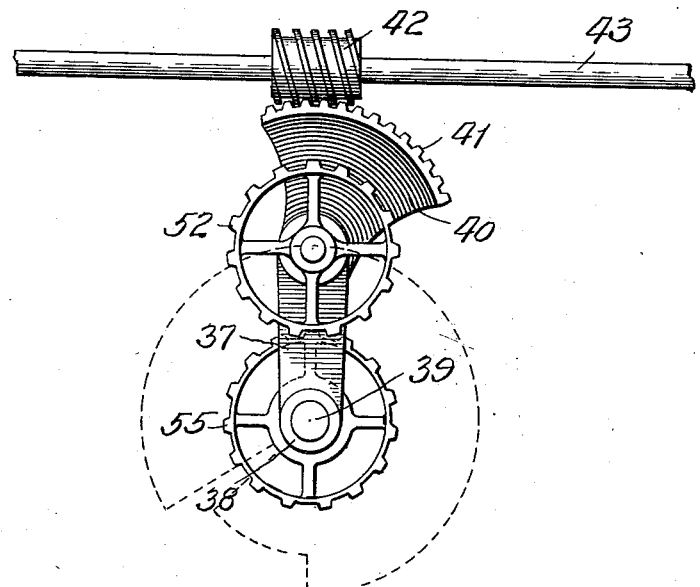
Witnesses:
John Enders
George Mankle
Inventor:
Jay Van Vranken,
by Wallace R. Lane
Atty.
COLUMBIA PLANOGRAPH CO., WASHINGTON, D. C.

UNITED STATES PATENT OFFICE.

JAY VAN VRANKEN, OF DAVENPORT, IOWA.

SELF-PROPELLED PLOW.

1,043,174. Specification of Letters Patent. Patented Nov. 5, 1912.

Application filed July 10, 1911. Serial No. 637,612.

*To all whom it may concern:*

Be it known that I, JAY VAN VRANKEN, a citizen of the United States, residing at Davenport, in the county of Scott and State of Iowa, have invented a new and useful Improvement in Self-Propelled Plows, of which the following is a specification.

My invention relates to self-propelled or engine driven plows and embodies various features of novelty over plows of this kind heretofore constructed.

Referring to the accompanying drawings, Figure 1 is a plan view of a plow embodying my invention; Fig. 2 is a side elevation thereof; Fig. 3 is a transverse cross-sectional view substantially on line 3—3 of Fig. 1 showing one of the swingingly supported plow shafts rotated through an angle of about 90 degrees, and Fig. 4 is a side view of Fig. 3 looking from left to right.

In the particular embodiment illustrated in the drawings the metal frame work which supports the parts in operative relation comprises a pair of side bars 1 and 2, a front bar 3, a rear bar 4 and an intermediate bar 5 running longitudinally of the frame work as best shown in Fig. 1. At the front, the side bar 1 is curved inwardly as indicated at 6 to meet the front bar 3. Similarly the side bar 2 is curved inwardly at 7. The side bar 2 is preferably stepped as shown in Fig. 1 so as to accommodate in the least possible space the plow disks to be presently referred to. The bars of the frame work may be conveniently formed of angle iron or channel iron and are securely riveted together at the meeting ends. The frame work is at the rear provided with a propelling wheel 8 and at the front with a pair of steering wheels 9 and 10. The propelling wheel has a broad tread rim and is journaled between the side bar 1 and the intermediate bar 5. The steering wheels 9 and 10 are movable about vertical studs or bolts 11 carried by the cross piece 12 which is rigidly mounted on the front bar 3 of the frame work. Any suitable connections may be used for connecting the steering wheels 9 and 10 to the frame work so as to move laterally for regulating the direction of travel of the plow. These wheels are adapted to be controlled from the operator's seat by mechanisms to be described later on.

Between the side bar 1 and the longitudinal bar 5 is journaled the power shaft 13 which carries the engine fly-wheel 14 and the driving wheel 15. The power shaft 13 is arranged to be operatively connected with any suitable form of engine which is preferably located in the space 16. In order not to obscure Fig. 1, I have made no attempt to show any specific form of engine, since the proper mounting of a suitable form of engine in the space 16 on the frame work and its connection with the power shaft 13, are matters which are easily within the skill of the mechanic. The propelling wheel 8 is driven from the power shaft 13 by any suitable connections. In the drawings I have shown a large sprocket wheel 17 rigidly mounted on the shaft of the propelling wheel and a sprocket chain 18 connecting the sprocket wheel 17 with the sprocket wheel 15 on the power shaft. It is obvious, however, that the driving connection between the power shaft 13 and the propelling wheel may be established in other ways. The motion of the power shaft 13 is also communicated to a series of plow disks of which three are shown in the drawings for the sake of illustration. These disks are indicated by the reference numerals 19, 20 and 21. The number of plow disks used may of course be varied. As clearly seen from the drawings, each of these plow disks consists of a concave helical surface. In side elevation the outer periphery 22 of each disk presents the outline of a circle or part of a circle. At its forward end the helical surface of my new plow disk presents a substantially radial cutting edge 23, while at the other end the helical surface terminates in a lateral projection or fluke 24. The function of this lateral projection or fluke is to turn over the furrow slice which has been cut loose from the soil by the disk. In the forward or normal operation of the plow, the plow disks travel in the direction indicated by the arrow *a* in Fig. 2. It will thus be seen that the point 25 of the disk enters the ground first. As the plow disk continues to revolve the furrow slice is gradually deflected by the helical surface of the disk, and is then turned over by the fluke 24. In the preferred form of my invention the plow disk is formed integral with a sleeve by means of which the disk is rotatably mounted on a supporting shaft. In the particular form shown in the drawings the rear plow disk 19 is formed integral with its bearing sleeve 26. The integral bearing sleeves for the plow disks 20 and 21 are indicated by 27 and 28 respectively. It will be observed from Fig. 1 that the bearing sleeves gradually decrease in length from the front of the plow toward the rear. This is to permit a staggered arrangement of the plow disks.

The plow disks are operatively mounted on the plow frame in the following manner: On the side bar 2 are fixed suitable bearing brackets 29, while bearing brackets 30 are secured to the intermediate bar 5. The brackets 29 and 30 are in transverse alinement with each other, there being a pair of brackets for each plow disk. The outer bearing brackets 29 are each provided with a bearing portion 31 for receiving a pivot stud 32. The inner bearing brackets 30 are each provided with a longitudinal bearing portion 33 for receiving the stub shaft 34, as best shown in Fig. 3. On each of the studs 32 is swingingly mounted a suitable form of hanger 35 provided with a bearing portion 36. Similarly, on each of the stub shafts 34 is swingingly mounted a hanger 37 having a bearing portion 38. In the bearing portions of each pair of transversely alined hangers is integrally supported a shaft 39. It is on these transverse shafts 39 that the plow disks are mounted by means of their bearing sleeves. Thus, on the rear shaft 39 is mounted the bearing sleeve 26 of the rear disk 19; on the intermediate shaft 39 is mounted the sleeve 27 of the intermediate disk 20, and on the front shaft 39 is mounted a sleeve 28 of the front plow disk 21. The brackets 35 and 37 are arranged to be swung about their pivots so as to raise and lower the plow disks for the purpose of regulating the working depth of the disks and also for throwing them entirely out of contact with the earth when not in use.

The connections shown in the drawings for operating the swinging brackets are as follows: From each of the inner brackets 37 extends an arm 40 terminating in a toothed segment 41 adapted to mesh with a worm 42. As shown in Figs. 1 and 2, the worms 42 are fixed upon the horizontal driving shaft 43 which is journaled at its ends in suitable bearings 44 secured to the intermediate bar 5. A beveled pinion 45 fixed upon the shaft 43 meshes with a beveled gear 46 which is rotatably mounted on the transverse stud 47 projecting from the intermediate bar 5. A hand wheel 48 rigidly connected with the beveled gear 46 in any suitable manner (as by being cast integral therewith), serves to operate the beveled gear 46, the motion of which is transmitted to the longitudinal shaft 43. As the shaft 43 rotates, the worms 42 cause rotation of the arms 40 in a direction pending upon the direction in which the hand wheel 48 is turned by the operator. The swinging of the inner brackets 37 raises or lowers the supporting shafts 39 and consequently the plow disks. The hand wheel 48 is arranged in proximity to the operator's seat 49 which is suitably supported on the intermediate bar 5.

I will now describe the driving connections between the power shaft 13 and the plow disks.

Near the inner end of the power shaft 13 is fixed the sprocket wheel or other equivalent member 50 which is connected by a sprocket chain 51 with the sprocket wheel 52 fixed on the outer end of the front stub shaft 34—that is to say, the stub shaft supported in the front bracket 30, as shown in Fig. 3. To the inner end of the front stub shaft 34 is fixed the sprocket pinion 53 connected by a chain 54 with the sprocket wheel 55 rigidly fixed upon the bearing sleeve 28. It will thus be clear that the bearing sleeve of the front plow disk is operatively connected with the power shaft 13, the motion being transmitted from the power shaft to the sprocket wheel 50, through the sprocket chain 51 to the sprocket wheel 52 and the front stub shaft 34, from this shaft to the sprocket pinion 53 and thence to the sleeve 28 through the sprocket chain 54 and the sprocket wheel 55. On the sleeve 28 is rigidly mounted a second sprocket wheel 56 which is connected by a sprocket chain 57 with the sprocket wheel 58 fixed upon the bearing sleeve 27 of the intermediate plow disk 20. A second sprocket wheel 59 is fixed upon the intermediate sleeve 27 and is connected by a sprocket chain 60 with the sprocket wheel 61 fixed upon the rear sleeve 26. In this way the sleeve of the front plow disk serves as the driving member for the other plow disks.

While the above connections between the power shaft 13 and the plow disks have been herein shown and described in connection with the preferable form of my invention, I would have it understood that in the broad aspect of my invention, any suitable transmission connections may be used between the power shaft and the plow disks.

The steering wheel 10 is arranged to run in a previously made furrow and is vertically adjustable to limit the penetration of the plow disks. In Fig. 2 the surface of the ground is diagrammatically indicated by the line G, while the bottom of the furrow in which the wheel 10 runs is diagrammatically indicated by the line F. The wheel 10 is journaled in a slidable bearing block 62 which is capable of up and down movement in the vertical frame-piece 63, as best shown in Fig. 2. The block 62 is at its upper end connected with the hand-lever 64 by means of the link 65. The lever 64 is pivoted at 66 to the segmental arm 67 which is provided with teeth 68. As shown in Fig. 1, the toothed arm 67 is supported at an angle with respect to the longitudinal axis of the frame work, in order to bring the inner end of the lever 64 within reach of the operator when he is in his seat. The lever 64 is normally locked in any of its adjusted positions by the locking dog 69 slidably carried on the lever 64. A rod 70 which is at its rear end connected to the dog 69 terminates at the front end in a hand piece 71 arranged in proximity to the grip portion 72 on the hand lever 64. A spring 73 bearing at one end against the dog 69 and at the other end fixed to the lever 64, normally holds the dog against the teeth 68 of the arm 67. When the operator desires to adjust the lever 64 so as to regulate the vertical position of the wheel 10 he first presses on the hand piece 71 to release the dog 69 from the teeth 68, and then he moves the lever 64 either up or down until the wheel 10 has been brought to the right position. The rod 70 is then released and the spring 73 automatically forces the locking dog 69 into engagement with the teeth 68.

In the broad aspect of my invention other operating mechanisms than that just described may be used for regulating the vertical position of the wheel 10.

The steering wheels 9 and 10 may be adjusted simultaneously by any suitable steering mechanism to control the direction of travel of the plow. In the drawings I have shown an arm 74 projecting rearwardly from the supporting bracket of each wheel. At the center of the frame work is arranged a horizontal gear 75 rotatably mounted in a suitable bracket 76 projecting rearwardly from the front bar 3. The gear 75 is provided with a crank pin 77 to which the inner ends of the links 78 are pivoted. The outer ends of the links 78 are connected to the arms 74. From the front of the frame work extends rearwardly a shaft 79 on which is fixed the worm 80 arranged to mesh continuously with the gear 75. An upwardly extending steering shaft 81 is at its lower end connected with the rear end of the shaft 79 by a universal joint 82. At its upper end the shaft 81 is provided with a hand wheel 83 arranged in front of the operator's seat 49. When the operator turns the hand wheel 83 the shaft 79 is rotated and the worm 80 moves the gear 75 in one direction or the other. Rotation of the gear 75 causes a lateral movement of the wheels 9 and 10 through the links 78.

It is understood that I do not limit myself to any specific form of mechanism for controlling the steering wheels 9 and 10.

It will be observed that when the operator is in his seat he can readily control the mechanism for adjusting the vertical height of the plow disks, the mechanism for adjusting the vertical position of the wheel 10 and the mechanism for controlling the steering wheels of the pow. All of these mechanisms are operable while the plow is in motion.

While I have herein shown and described a specific form of plow embodying the various features of my invention, it is to be understood that changes and modifications may be made by those skilled in the art without departing from the scope of the invention as defined in the appended claims.

Having thus described my invention, what I claim as new and desire to secure by Letters Patent of the United States is:

1. In a self-propelled plow, the combination of a frame work having a longitudinal partition and having a stepped side bar, a plurality of shafts mounted transversely between said partition and the stepped side of the frame work, plow disks arranged on said transverse shafts in staggered relation, an engine driven power shaft mounted transversely between said partition and the other side of the frame work toward the front thereof, a propelling wheel mounted between said partition and said shaft side of the frame work at the rear thereof, a driving connection between said power shaft and said propelling wheel, driving connections between said power shaft and said plow disks, and means for simultaneously adjusting said disks to vary the depth of cut.

2. In a self-propelled plow, the combination of a frame work having a longitudinal partition and a stepped side bar, a plurality of hangers pivoted to said partition, a corresponding plurality of hangers pivoted to one side of said frame work in transverse alinement with said first mentioned hangers, a shaft immovably carried by each pair of transversely alined hangers, a plow disk mounted on each shaft, said plow disks being arranged in staggered relation to each other an engine driven power shaft mounted transversely between said partition and the other side of the frame work toward the front thereof, a propelling wheel mounted between said partition and said shaft side of the frame work at the rear thereof, a driving connection between said power shaft and said propelling wheel, driving connections between said power shaft and said plow disks, and means for adjusting said hangers to regulate the working depth of the plow disks or raise them into inoperative position.

3. In a self-propelled plow, the combination of a frame work having a longitudinal partition, a plurality of hangers pivoted to said partition, a corresponding plurality of hangers pivoted to one side of said frame work in transverse alinement with said first mentioned hangers, a shaft carried by each pair of transversely alined hangers, a plow disk mounted on each shaft, said plow disks being arranged in staggered relation to each other, an engine power shaft mounted transversely between said partition and the other side of the frame work toward the front thereof, a propelling wheel mounted between said partition and said shaft side of the frame work at the rear thereof, a driving connection between said power shaft and said propelling wheel, driving connections between said power shaft and said plow disks, and means for adjusting said hangers to regulate the working depth of the plow disks or raise them into inoperative position.

4. In a self-propelled plow, the combination of a frame work having a longitudinal partition, a plurality of hangers pivoted to said partition, a corresponding plurality of hangers pivoted to one side of said frame work in transverse alinement with said first mentioned hangers, a shaft immovably carried by each pair of transversely alined hangers, a plow disk mounted on each shaft, said plow disks being arranged in staggered relation to each other, an engine driven power shaft mounted transversely between said partition and the other side of the frame work toward the front thereof, a propelling wheel mounted between said partition and said shaft side of the frame work at the rear thereof, a driving connection between said power shaft and said propelling wheel, driving connections between said power shaft and said plow disks, a segmental worm wheel fixed to each of said first mentioned hangers, a horizontal shaft associated with said worm wheels, a plurality of worms fixed upon said horizontal shaft to mesh with said worm wheels, and means for operating said horizontal shaft to adjust said hangers and thereby regulate the working depth of the plow disks or raise them into inoperative position.

5. In a self-propelled plow, the combination of a frame work having a longitudinal partition, a plurality of hangers pivoted to said partition, a corresponding plurality of hangers pivoted to one side of said frame work in transverse alinement with said first mentioned hangers, a shaft carried by each pair of transversely alined hangers, a plow disk mounted on each shaft, said plow disks being arranged in staggered relation to each other, a segmental worm wheel fixed to each of said hangers, a horizontal shaft associated with said worm wheels, a plurality of worms fixed upon said horizontal shaft to mesh with said worm wheels and a hand wheel geared to said horizontal shaft to adjust the hangers and thereby regulate the working depth of the plow disks, or raise them into inoperative position.

6. In a self-propelled plow, the combination of a frame work having a longitudinal partition, a plurality of shafts mounted transversely between said partition and one side of the frame work, plow disks arranged on said transverse shafts in staggered relation, said shafts being vertically adjustable simultaneously to regulate the working depth of the plow disks, an engine driven power shaft mounted transversely between said partition and the other side of the frame work toward the front thereof, a propelling wheel mounted between said partition and said shaft side of the frame work at the rear thereof, a driving connection between said power shaft and said propelling wheel, driving connections between said power shaft and said plow disks, and a hand operated horizontal shaft for regulating the vertical position of said transverse shafts.

7. In a self-propelled plow, the combination of a frame work including side bars and an intermediate bar running longitudinally of the frame work, one of said side bars being stepped, a propelling wheel journaled at the rear of said frame work, a pair of steering wheels at the front of said frame work, a power shaft journaled transversely to said frame work and connected to said propelling wheel, said propelling wheel and power shaft being arranged to one side of said intermediate bar, a plurality of transverse shafts arranged at the other side of said intermediate bar, a plurality of plow disks mounted on said transverse shafts in staggered relation to each other, driving connection between said power shaft and said transverse shafts, and an operator's seat mounted on said intermediate bar.

8. In a self-propelling plow, the combination of a frame work including side bars and an intermediate bar running longitudinally of the frame work, a propelling wheel journaled at the rear of said frame work, a power shaft journaled transversely to said frame work and connected to said propelling wheel, said propelling wheel and power shaft being arranged to one side of said intermediate bar, a plurality of transverse shafts arranged at the other side of said intermediate bar, a plurality of plow disks mounted on said transverse shafts in staggered relation to each other, said transverse shafts being vertically adjustable simultaneously and to an equal degree to regulate the working depth of the plow disks, driving connection between said power shaft and said transverse shafts, an operator's seat mounted on said intermediate bar, a horizontal shaft supported by said intermediate bar, operative connections between said horizontal shaft and said transmission shafts to raise or lower the latter in unison when the horizontal shaft is operated, and means operable from the operator's seat for actuating said horizontal shaft.

9. In a self-propelled plow, the combination of a frame work, a plurality of vertically swinging hangers carried thereby in transversely alined pairs, a shaft mounted in each pair of hangers, a plurality of plow disks mounted on said shafts in staggered relation to each other, a segmental worm wheel projecting from one hanger of each pair, a horizontal shaft associated with said worm wheels, a plurality of worms fixed upon said horizontal shaft to mesh with said worm wheels, and means for operating said horizontal shaft to adjust the hangers and thereby regulate the working depth of the plow disks or raise them into inoperative position.

10. In a self-propelled plow, the combination of a frame work, a plurality of transverse shafts carried thereby, a sleeve rotatably mounted on each shaft, a plow disk rigidly mounted on each sleeve, said disks being arranged in staggered relation to each other, an engine driven power shaft supported on said frame work, a toothed wheel fixed upon each of the front and rear sleeves, a pair of toothed wheels fixed upon the intermediate sleeve or sleeves, means for successively connecting said toothed wheels, so that the wheels of the front sleeve drive the other sleeves, a driving connection between said front sleeve and said power shaft, and means for simultaneously raising all of said transverse shafts an equal amount.

11. In a self-propelled plow, the combination of a frame work, a plurality of transverse shafts carried thereby so as to swing in a vertical plane, a sleeve rotatably mounted to turn on each shaft, a plow disk on each sleeve, said disk being arranged in staggered relation to each other, and means for simultaneously raising and lowering said transverse shafts an equal amount to regulate the working depth of all the plow disks.

12. In a self-propelled plow, the combination of a frame work, a plurality of transverse shafts carried thereby so as to swing in a vertical plane, a sleeve rotatably mounted on each shaft, a plow disk on each sleeve, said disk being arranged in staggered relation to each other, a toothed wheel fixed upon the front and rear sleeves, a pair of toothed wheels fixed upon the intermediate sleeve or sleeves, means for successively connecting said wheels so that the toothed wheel on the front sleeve drives the other sleeves, a driving connection between said front sleeve and said power shaft, and means for simultaneously raising and lowering said transverse shafts an equal amount to regulate the working depth of the plow disks.

In witness whereof, I hereunto subscribe my name this 1st day of July A. D. 1911.

JAY VAN VRANKEN.

Witnesses:
  V. C. Wunder,
  Geo. J. Schreck.

---

Copies of this patent may be obtained for five cents each, by addressing the "Commissioner of Patents, Washington, D. C."